UNITED STATES PATENT OFFICE 2,560,280

BIS-QUATERNARY AMMONIUM COMPOUNDS

Peter L. de Benneville, Philadelphia, Pa., assignor to Rohm & Haas Company, Philadelphia, Pa., a corporation of Delaware No Drawing. Application June 23, 1950, Serial No. 170,045

9 Claims. (Cl. 260—567.6)

This invention concerns bis-quaternary ammonium compounds of the formula

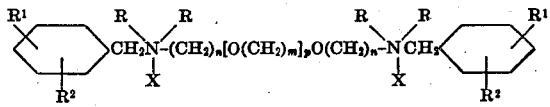

wherein R is an alkyl group of not over two carbon atoms, $R^1$ is an alkyl group of seven to ten carbon atoms, $R^2$ is a member of the class consisting of hydrogen and the methyl group, X is an anion, $m$ is an integer from one to two, $n$ is an integer from one to two, and $p$ is a number from zero to three. These compounds are characterized by excellent stability, high solubility, a high degree of bactericidal and fungicidal activity, and effectiveness against a wide variety of organisms.

The balanced combination of these properties is particularly desirable in the case of quaternary ammonium salts for their use under the diverse conditions encountered in practical applications. A high phenol coefficient against not only the usual test organism but also against other bacteria is one relative measure of the worth of such compounds. This type of evaluation must, however, be weighed against the relative costs of starting materials and the ease with which they can be reacted. The resulting quaternary salt then should possess good stability under conditions which are encountered in formulation and use. For many applications they should have a high degree of solubility in water. This permits preparation of concentrated solutions, an advantageous means of handling and applying the compounds. High solubility also ensures ready removal by rinsing subsequent to application.

In previously known bis-quaternary ammonium salts the desired combination of such properties has been lacking or has not attained the balance exhibited by the novel compounds of this invention. For example, bis compounds having an unsaturated linkage do not have so good stability in the presence of alkaline cleaners as is desirable although one of the commonest uses of quaternaries is in conjunction with alkaline agents. When the linkage is saturated, there is such a loss in solubility that only relatively dilute stock solutions can be made. Previously known quaternaries having an ether group in a linkage between two nitrogen atoms are relatively low in bactericidal or fungicidal action. It was, thus, an unexpected outcome to discover that bis-quaternary ammonium compounds having an ether linkage could be made which have high solubility and good stability coupled with a marked degree of effectiveness against many and diverse types of organisms.

The quaternary ammonium compounds which I have now discovered and which I have found possess a very favorable balance of properties have an alkylbenzyl group on each of two nitrogen atoms. The alkyl substituent must have at least seven carbon atoms and may contain as many as ten, although a range of seven to nine is preferred. The phenyl ring may contain a methyl group in place of a ring hydrogen. The two nitrogen atoms are bound together by means of a saturated divalent aliphatic chain containing at least one ether group as in —CH$_2$OCH$_2$—, —CH$_2$CH$_2$OCH$_2$CH$_2$—,
—CH$_2$CH$_2$OCH$_2$OCH$_2$CH$_2$—,
—CH$_2$OCH$_2$CH$_2$OCH$_2$—,
—CH$_2$CH$_2$OCH$_2$CH$_2$OCH$_2$CH$_2$—,
—CH$_2$OCH$_2$CH$_2$OCH$_2$CH$_2$OCH$_2$—,
—CH$_2$OCH$_2$CH$_2$OCH$_2$CH$_2$OCH$_2$CH$_2$OCH$_2$—,
—CH$_2$CH$_2$OCH$_2$CH$_2$OCH$_2$OCH$_2$CH$_2$OCH$_2$CH$_2$— or the like. The remaining valences of the nitrogen atoms are satisfied with methyl or ethyl groups and with an anion, particularly chlorine or bromine.

The ether linkage can be supplied from a dihaloether, $$X(CH_2)_n[O(CH_2)_m]_pO(CH_2)_nX$$

which is reacted with a tertiary amine of the formula

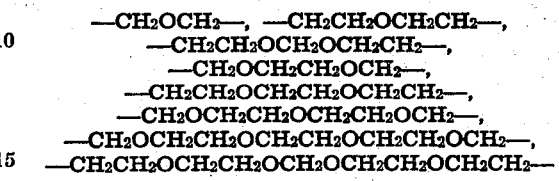

The dihaloether may be dichloromethyl ether, dibromomethyl ether, dichloroethyl ether, dibromoethyl ether, dichlorotriglycol, dibromotriglycol, the formal from ethylene chlorohydrin or bromohydrin,

the formal

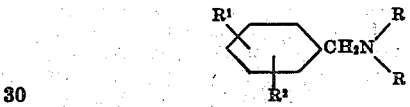

etc.

Alternatively, dimethylamine or diethylamine is reacted with formaldehyde and a glycol to give an intermediate, a tertiary bisamino ether,

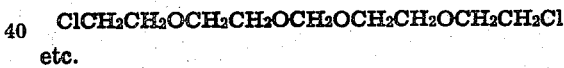

which in turn is reacted with an alkylbenzyl halide,

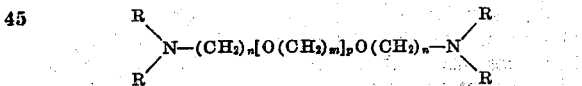

to give the quaternary salt. The intermediate is derivable from ethylene glycol, diethylene glycol, triethylene glycol, or the like by reaction of dialkylamine and formaldehyde with such a glycol. The reaction may be effected in one step or dialkylamine and formaldehyde may be first reacted to give

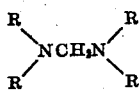

one mole of which is then reacted with another mole of formaldehyde and with a mole of a glycol. A revertible polymer of formaldehyde is conveniently used as a source of formaldehyde. An alternative approach to making bis-dialkyl-aminoethers is through reaction of dihaloether and dialkylamine, the bis-tertiary amine being then reacted with an alkylbenzyl halide.

The alkylbenzyl halides which contain an alkyl group of seven to ten carbon atoms are obtained from alkylbenzenes or methylalkylbenzenes of corresponding molecular size through halomethylation. The resulting alkylbenzyl halides may be reacted as shown above with a tertiary bis-aminoether intermediate, or they may be reacted with diethylamine or dimethylamine to yield the alkylbenzyldialkylamines, which are in turn reacted with a dihaloether. Other methods may, of course, be used for preparation of alkylbenzyldimethyl- or alkylbenzyldiethyl-amine.

The alkylbenzyl halides may be prepared in accordance with the method described by De Benneville and Bock in application Serial No. 28,274, filed May 20, 1948, now abandoned. An alkylbenzene or alkyltoluene in which the alkyl group contains, for purposes of the present invention, seven to ten carbon atoms is halomethylated by reacting such a hydrocarbon with anhydrous formaldehyde and hydrogen chloride or bromide in the presence of a catalyst mixture formed by mixing one molecular proportion of zinc chloride with 1.5 to 8 molecular proportions of an aliphatic monocarboxylic acid of one to three carbon atoms, such as formic, acetic, chloroacetic, or propionic. Acid anhydrides may be used in place of these acids or in admixture therewith. Formaldehyde may be used as a gas or as a revertible polymer. The equivalent of formaldehyde and hydrogen chloride or bromide is provided by a halomethyl ether. It should be noted that either hydrogen chloride or hydrogen bromide can be used in the above reaction.

For one mole equivalent of alkylbenzene from one to 2.5 and preferably 1.5 to 2.5 equivalents of formaldehyde are used together with 0.5 to 2.5 molecular proportions of zinc chloride associated with the proportion of monocarboxylic acid given above. Reaction temperatures of 50° C. to 100° C. are here effective. By this method good yields of alkylbenzyl halides are obtained with introduction almost entirely of a single halomethyl group and without formation of troublesome resinous products.

The alkylbenzene hydrocarbons which may be viewed as starting materials include both alkyl benzenes and alkyltoluenes. With alkyl substituents of seven to ten carbon atoms the exact form of this group is not important. It may be of straight or branched chain structure and may be primary, secondary, or tertiary. The relative position of alkyl group and methyl group in the alkyltoluenes is not critical. Known methods for introducing alkyl groups in benzene and toluene may be used. For example, an acyl halide may be reacted therewith and the acyl group introduced into the phenyl ring and then reduced. By other procedures olefinic hydrocarbons of the required size are reacted with benzene or toluene. The useful alkyl groups here-employed vary from heptyl to decyl. The hydrocarbons which may be taken for halomethylation are heptylbenzene, heptyltoluene, octylbenzene, octyltoluene, nonylbenzene, nonyltoluene, decylbenzene, and decyltoluene in their various isomeric forms. Typical of these are (1-methylhexyl)benzene, (1-ethylpentyl)benzene, (1,3-dimethyl-1-propylbutyl)-benzene, (1-methylheptyl)benzene, (2-ethylhexyl)benzene, (1-ethylhexyl)benzene, (3,5,5-trimethylhexyl)benzene, (1-methylnonyl)benzene, (1-ethyloctyl)benzene, o-, m-, or p-octyltoluene, p-(1-methylheptyl)toluene, p-(1-ethylpentyl)-toluene, (1-ethyl-3-methylbutyl)benzene, (1,3,3-trimethylbutyl)benzene, and the like and mixtures of such hydrocarbons.

In the following examples there is shown the preparation of typical alkylbenzyl halides. Parts given are by weight.

EXAMPLE 1

Commercial 3-heptanol was dehydrated on an alumina catalyst at 400° C. to yield a mixture of 2-heptene and 3-heptene which was condensed and distilled.

There were mixed 125 parts of this product, 198 parts of benzene, and 196 parts of concentrated sulfuric acid while the mixture was stirred and held at 5° C. The mixture was stirred for three hours with the temperature of the mixture being allowed to advance above room temperature. Layers were permitted to form and the upper layer was taken. It was twice washed with sulfuric acid and distilled to yield 167 parts of heptylbenzene, probably a mixture of 2-heptylbenzene and 3-heptylbenzene. The product had a carbon content of 87.3% and a hydrogen content of 11.7%, compared with theoretical values of 88.6% and 11.7% respectively.

There were mixed 160 parts of this product, 90 parts of anhydrous zinc chloride, and 138 parts of glacial acetic acid. Thereto was added at 60° C. 106 parts of dichloromethyl ether. The mixture was stirred for four hours and then allowed to stand and separate into layers. The upper layer was washed with water, with sodium bicarbonate solution, and with water and then distilled. At 127°–132° C./2 mm. there was obtained a fraction of 128 parts which corresponded in composition to heptylbenzyl chloride.

EXAMPLE 2

A mixture of 95 parts by weight of octylbenzene (chiefly 2-octylbenzene with some 3-octylbenzene), 30 parts of paraformaldehyde, 54 parts of anhydrous zinc chloride, and 120 parts of glacial acetic acid was stirred at 50° C. while hydrogen chloride was passed in for two hours at a fairly rapid rate. The reaction mixture was allowed to stratify and the upper layer was taken, washed with hot water, with a 10% sodium bicarbonate solution, and with hot water, dried over sodium sulfate and distilled. The forerun of 30 parts consisted of octylbenzene. There was then obtained at 119°–121° C./1 mm. 71 parts of octylbenzyl chloride.

EXAMPLE 3

To a mixture of 46.5 parts of octylbenzene (chiefly 2-octylbenzene), 17 parts of anhydrous zinc chloride, and 40 parts of glacial acetic acid there was added dropwise 50 parts of bis-bromomethyl ether. The mixture was stirred and heated at 70° C. for four hours in all. Layers were allowed to form and were separated. The upper layer was washed with hot water, with 10% sodium bicarbonate solution, and with water. It was dried over sodium sulfate and distilled. At 155°–174° C./2 mm. there was obtained a fraction corresponding in composition to octylbenzyl bromide. It contained by analysis 28.8% of bromine. Theory for this product is 28.3%.

EXAMPLE 4

To a mixture of 70 parts of 2-ethylhexylbenzene (prepared according to the method of Sulzbacher and Bergmann, J. Org. Chem. 13, 303 (1948)), 50.3 parts of anhydrous zinc chloride, and 60 parts of glacial acetic acid there was added with stirring 42.5 parts of dichloromethyl ether over the course of an hour, while the reaction mixture was maintained at 60° C. Stirring was continued for another two hours with the temperature held at 60° C. Layers were then allowed to form and separated. The product layer was washed with sodium bicarbonate solution and distilled at 110°–125° C./0.07 mm. The distillate corresponded in composition to 2-ethylhexylbenzyl chloride.

EXAMPLE 5

To a mixture of 138 parts by weight of toluene and 90 parts of anhydrous hydrogen fluoride, contained in a copper flask and held at 0°–10° C., there was added 336 parts of mixed octenes, boiling at 123°–134° C., at such a rate that the temperature did not rise above 10° C. The reaction mixture was stirred for an hour and then poured upon ice. The organic layer was separated, washed with water, with 5% sodium bicarbonate solution, and again with water, dried over calcium chloride, and finally distilled. Unreacted toluene and octene were removed and the organic liquid stripped by heating to 115° C./35 mm. There was then obtained a fraction between 135° C./35 mm. and 155° C./0.5 mm. which consisted essentially of octyltoluenes.

In the reaction vessel equipped with a stirrer a mixture was made of 32 parts of octyltoluene, 25 parts of anhydrous zinc chloride, and 60 parts of glacial acetic acid. With the temperature kept at 50° to 60° C. there was added thereto 20 parts of dichloromethyl ether. The temperature of the mixture was then raised to 90° C. for three hours. The reaction mixture was then separated into layers. The product layer was washed with water, with a 5% sodium bicarbonate solution, and again with water. Upon distillation a fraction was obtained at 133°–148° C./0.3 mm. which corresponded in composition to 2 - methyl - 5 - octylbenzyl chloride.

EXAMPLE 6

To a mixture of 184 parts of toluene and 103 parts of sulfuric acid there was added 112 parts of octene while the mixture was stirred and held at 5°–13° C. The octene had been prepared by dehydration of capryl alcohol on an alumina catalyst (cf. Komarewski, Ulick, and Murray, J. Am. Chem. Soc. 67, 557 (1945)). The reaction mixture was stirred for three hours at room temperature, and the product layer was separated. It was washed twice with concentrated sulfuric acid and distilled. The fraction taken at 93°–95° C./0.3 mm. corresponded in composition to sec.-octylmethylbenzene.

To a mixture of 81 parts of this product, 47.5 parts of anhydrous zinc chloride, and 65 parts of glacial acetic acid there was added 46 parts of dichloromethyl ether while the mixture was stirred and held at 50°–60° C. for an hour. It was stirred at 70°–75° C. for four hours and allowed to form layers. The upper layer was separated, washed with water and sodium bicarbonate solution, and distilled. The fraction taken at 130°–150° C./0.3 mm. amounted to 43.8 parts and corresponded in composition to methyloctylbenzyl chloride.

EXAMPLE 7

Comercial diisobutyl carbinol was dripped slowly over a bed of alumina at 400° C. The vapors were taken off and condensed. Therefrom nonene was separated and distilled at 72°–75° C./100 mm. The product, containing by analysis 85.7% of carbon and 14.3% of hydrogen, was 2,6-dimethyl-3-heptene, for which the theoretical content of carbon is 85.8% and of hydrogen is 14.3%.

There was added 135 parts by weight of this product to a stirred mixture of 159 parts of benzene and 147 parts of sulfuric acid. The temperature was held between 0° and 10° C. After the mixture had been stirred for three hours, it was allowed to form layers. The upper layer was distilled and the distillate redistilled at 102°–106° C./3 mm. This distillate had a molecular weight of 203 (theory 204) and corresponded in composition to nonylbenzene. The yield was 95 parts.

To a mixture of 80 parts of nonylbenzene, 40 parts of zinc chloride, and 59 parts of glacial acetic acid there was added at room temperature 45 parts of dichloromethyl ether. The mixture was stirred and heated at 70° C. for three hours. It was then allowed to stand and form layers. The upper layer was separated, washed with hot water, and with sodium bicarbonate solution, dried over sodium sulfate, and distilled. The fraction distilling at 141°–142° C./2 mm. was nonylbenzyl chloride.

EXAMPLE 8

Boron trifluoride gas was slowly bubbled into 18 parts of water during a 45-minute period while the temperature of the water solution was kept below 30° C. The increase in weight of the solution showed that 68 parts of boron trifluoride had been absorbed.

There were mixed 86 parts of the above boron trifluoride solution and 117 parts of benzene and thereto was added dropwise with good agitation 126 parts of propylene trimer with the temperature at 25°–30° C. Two hours was allowed for the reaction. The reaction mixture was then permitted to form layers, which were separated. The oil layer was washed and distilled at reduced pressure. The product, nonylbenzene, was collected at 127°–152° C./27 mm.

A mixture was prepared from 612 parts of nonylbenzene prepared as above, 205 parts of anhydrous zinc chloride, and 240 parts of glacial acetic acid and thereto was slowly added 345 parts of dichloromethyl ether with the temperature at 55° C. The reaction mixture was then stirred for two hours with the temperature at 70° C. Layers were then separated. The oil layer was washed with hot water and with 10% sodium bicarbonate solution and then stripped to yield crude nonylbenzyl chloride. This was distilled at 128°–152° C./1.5 mm. to give a product which corresponded very closely in composition to theory.

EXAMPLE 9

To a mixture of 312 parts of benzene and 180 parts of sulfuric acid was added dropwise at 10°–20° C. 281 parts of decene, which was freshly prepared by dehydration of n-decanol on alumina. The mixture was stirred for five hours at room temperature. It was then allowed to form layers. The upper layer was separated, washed with concentrated sulfuric acid twice, and distilled. The fraction distilling at 115°–127° C./1.3 mm. was identified as sec.-decylbenzene.

A mixture of 54.5 parts of this sec.-decylbenzene, 27.3 parts of zinc chloride, and 60 parts of glacial acetic acid was stirred and heated to 70°–75° C. while 28.8 parts of dichloromethyl ether was slowly added. Stirring was continued at 70°–80° C. for five hours. Layers were allowed to form. The upper layer was separated, washed with water and sodium bicarbonate solution, dried and distilled. At 155°–175° C./1.8 mm. there was obtained a fraction of 30 parts which corresponded in composition to sec.-decylbenzyl chloride.

Other alkylbenzenes and other alkylbenzyl halides can be prepared by similar methods. As stated above, the alkylbenzyl halides can be reacted with tertiary bis-aminoethers to give the desired type of bis-quaternary compounds.

The alkylbenzyl halides may be converted to alkylbenzyldialkylamines which also serve as reactants in forming the bis-quaternary compounds. This step is accomplished by reacting alkylbenzyl halide and dimethylamine or diethylamine in the presence of an alkaline agent for taking hydrogen halide. An alkali metal hydroxide or an organic base such as pyridine or excess amine may be used. Although this type of reaction is conventional, specific examples follow to illustrate a convenient procedure. The method is similar to that used for reacting benzyl chloride and dimethylamine (Ber. 42, 2593 (1909) or Bull. soc. chim. (IV) 15, 168 (1915)) except that an alkylbenzyl halide is used and the system need not be anhydrous. The reaction is conveniently carried out in the presence of an inert organic solvent such as benzene, toluene, carbon tetrachloride, or the like. The alkylbenzyldimethylamine or alkylbenzyldiethylamine may usually be purified by distillation.

EXAMPLE 10

To a solution of eight parts of sodium hydroxide in 30 parts of water there was added 22.5 parts of an aqueous 40% dimethylamine solution. The reaction vessel in which this mixture was prepared carried a refluxing system cooled with dry ice and acetone. To the mixture there was added 22.5 parts of heptylbenzyl chloride. The reaction mixture was heated to give gentle refluxing and dimethylamine was slowly passed in during the course of three hours. Layers were then allowed to form and were separated. The product layer was washed with water until neutral to litmus and was heated under reduced pressure. There was obtained 20 parts of a light oil which gave the correct analysis for heptylbenzyldimethylamine.

This procedure was followed with 25.3 parts of nonylbenzyl chloride in place of the 22.5 parts of heptylbenzyl chloride shown above. There was obtained nonylbenzyldimethylamine in a yield of 18 parts. The same procedure applied to an equivalent amount of octylbenzyl chloride yielded octylbenzyldimethylamine. Substitution of equivalent weights of diethylamine led to the corresponding alkylbenzyldiethylamines.

The various alkylbenzyldialkylamines are reacted with dihaloethers to give quaternary salts as will be shown below.

Another type of intermediate from which the bisquaternary ammonium compounds of this invention can be prepared comprises bis-tertiary aminoethers. These can be formed by reacting a dihaloether with dimethylamine or diethylamine in the presence of a basic material to take up hydrogen halide. This reaction is performed in much the same way as that between an alkylbenzyl halide and dimethylamine or diethylamine. Examples will be given to illustrate this method. It will be obvious that other dihaloethers can be used in place of those shown in the illustrative examples and that equivalent weights of diethylamine can be used in place of the dimethylamine of these examples.

EXAMPLE 11

A mixture was prepared from 130 parts of dichloroethyl formal, 417 parts of 25% aqueous dimethylamine solution, and 60 parts of sodium hydroxide in pellet form. The mixture was charged to a stainless steel autoclave and heated for three hours at 110° C. Excess dimethylamine and some of the water was removed by gentle heating in a vacuum evaporator, and 20 parts of solid sodium hydroxide was added to assist in salting out the bis-amine. This was taken up in benzene. The benzene extract was then dried and distilled. Bis-dimethylaminoethyl formal was obtained at 104°–105° C/12 mm. in a yield of 98 parts by weight. The product was found by analysis to contain 14.5% of nitrogen, to have a neutralization equivalent of 96, and to correspond in structure to

for which the theoretical nitrogen content is 14.7% and the neutralization equivalent 95.

EXAMPLE 12

A mixture of 140 parts of triglycol dichloride, 414 parts of 25% aqueous dimethylamine solution, and 60 parts of solid sodium hydroxide was charged to a stirring autoclave and heated for three and one-half hours at 110°–120° C. Excess dimethylamine and some water were removed by heating under reduced pressure. Benzene was added to the concentrated reaction mixture and the mixture filtered to remove the salts formed. The filtrate was distilled through a short column and 82.2 parts of a colorless oil distilling at 126°–130.5° C./17 mm. was collected. This product corresponded in composition to

In the same way there may be prepared such compounds as

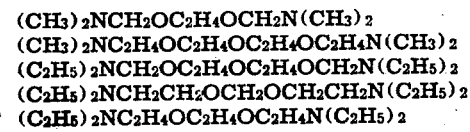

and the like.

Another procedure for preparing similar bis-dimethylamino and bis-diethylamino ethers is based on the reaction of dimethylamine or diethylamine, formaldehyde, and a glycol, as has been previously mentioned. This reaction may be effected between about 0° and 40° C. Typical reactions are shown in the illustrative examples which follow.

EXAMPLE 13

To 648 parts of 37% aqueous formaldehyde, which was cooled in an ice-bath, there was added 720 parts of anhydrous dimethylamine through a gas inlet tube. The temperature during this step did not exceed 12° C. There was then added 200 parts of sodium hydroxide in the form of pellets and this was dissolved with good cooling. Layers formed and were separated, the lower layer being discarded. The upper layer was dried over solid potassium hydroxide, being essentially N,N,N',N'-tetramethylmethylenediamine. This is a convenient intermediate for use in the reaction with glycols. The same end-result can be obtained, however, by reacting dialkylamine, formaldehyde, and glycol directly.

A mixture was made from 127.5 parts of tetramethylmethylenediamine, 62 parts of ethylene glycol, and 37.9 parts of paraformaldehyde. This mixture was taken up in 125 parts of benzene and heated in a vessel equipped with reflux condenser and water trap for six hours, at the end of which time no further separation of water was taking place. The mixture was cooled and stripped under reduced pressure on a steam bath. There was obtained 159 parts of a product which corresponded in composition to $(CH_3)_2NCH_2OCH_2CH_2OCH_2N(CH_3)_2$

EXAMPLE 14

In the same way there were reacted 127.5 parts of tetramethylmethylenediamine, 38 parts of formaldehyde, and 106 parts of diethylene glycol. The product obtained amounted to 209 parts and corresponded in composition to $(CH_3)_2NCH_2OCH_2CH_2OCH_2CH_2OCH_2N(CH_3)_2$ It was distilled at 89°–101° C./0.6–0.75 mm. with slight decomposition.

In the same way there may be used triethylene glycol to yield $(CH_3)_2NCH_2(OC_2H_4)_3OCH_2N(CH_3)_2$ Substitution of diethylamine for dimethylamine on a molecular basis yields the corresponding diethylamino compounds, $(C_2H_5)_2NCH_2OCH_2CH_2OCH_2N(C_2H_5)_2$
$(C_2H_5)_2NCH_2(OCH_2CH_2)_pOCH_2N(C_2H_5)_2$ Quaternary ammonium salts are prepared by reacting together one of the above bis-dialkylamino ethers and an alkylbenzyl halide in an approximate molar ratio of 1:2 or by reacting an alkylbenzyldialkylamine and a dihaloether in an approximate molar ratio of about 2:1. In either case the two reactants may be mixed directly or in the presence of a solvent, such as benzene, toluene, xylene, isopropanol, butyl alcohol, isopropyl ether, a nitroparaffin such as nitromethane, acetonitrile, formamide, or the like. Temperatures from about 30° to 140° C. may be used. The solvent may be driven off and the bis-quaternary ammonium compound recovered as a residue. In some cases the product may be precipitated or crystallized.

Examples follow which show typical preparations of quaternary ammonium compounds. These examples, like those presented above, are given by way of illustration and are not to be construed as limitations.

EXAMPLE 15

Bis-chloromethyl ether was prepared by the addition of chlorosulfonic acid to a suspension of paraformaldehyde in sulfuric acid (cf. Ind. Eng. Chem. 11, 827 (1919)). A solution of 43 parts of this ether in 200 parts of benzene was slowly added to 200 parts of nonylbenzyldimethylamine, the temperature being allowed to rise to 45° C. The reaction mixture was allowed to stand overnight and then extracted several times with heptane. This gave a pasty residue which was dissolved in benzene. The benzene solution was evaporated to yield 230 parts of a soft colorless solid which corresponded in composition to

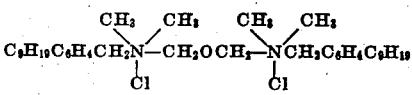

This compound had a phenol coefficient of 500 against *Salmonella typhosa* and 570 against *Staphylococcus aureus*. It is freely soluble in water and alkaline cleaning solutions.

EXAMPLE 16

A mixture of 134 parts of nonylbenzyldimethylamine and 35.8 parts of beta-chloroethyl ether in 80 parts of acetonitrile was heated under reflux on a steam bath for 48 hours. When the reaction mixture was cooled, a colorless solid precipitated. It was filtered off and dried. The yield was 55 parts of a compound corresponding in composition to

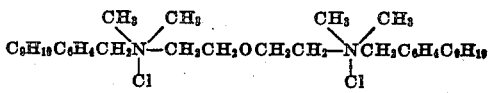

This compound was found to have a phenol coefficient of 625 against *Salmonella typhosa* and 765 against *Staphylococcus aureus*. It is freely soluble in water and in alkaline cleaning solutions.

EXAMPLE 17

A mixture of 150 parts of nonylbenzyldiethylamine, 58 parts of beta-bromoethyl ether, and 110 parts of acetonitrile was heated under reflux for 48 hours. The solvent was removed under reduced pressure and a colorless solid obtained. By analysis this compound was found to correspond closely to

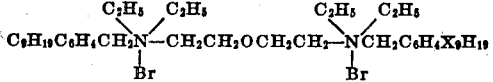

It has a phenol coefficient of 700 against *Salmonella typhosa* and 725 against *Staphylococcus aureus*.

EXAMPLE 18

A mixture of 185 parts of the bis-dimethylaminomethyl ether of ethylene glycol, 476 parts of octylbenzyl chloride, and 950 parts of benzene was heated at 50° C. for six hours and then left standing for two days at room temperature to give a clear solution. Thereto was added n-heptane. Layers formed, the product separating as a thick oil. This was collected and triturated several times with heptane. There was thus obtained 530 parts of a colorless, soft, sticky solid which was freely soluble in water and which corresponded in composition to

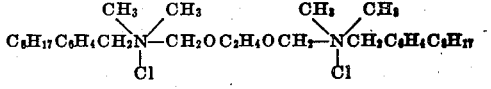

This product was found to have a phenol coefficient of 470 against *Salmonella typhosa* and of 850 against *Staphylococcus aureus*.

Bactericidal and bacteriostatic dilution values were determined with the above compound and many others, and representative data will be given for typical quaternary ammonium salts of this invention. These values are given in terms of the greatest effective dilutions at which the compounds are positively shown to have bacteriocidal and bacteriostatic effects against a variety of bacteria, both Gram-positive and Gram-negative. The compounds were evaluated by a method of successive dilution in which trypticase-soy broth was utilized. One per cent solutions of the products were diluted with the broth and the various dilutions autoclaved for 10 minutes at 10 to 12 pounds pressure. The dilutions were then cooled and inoculated with a four millimeter loopful of a culture of the test organism. The inoculated dilutions were incubated at 37° C. for 24 hours. The highest dilution showing no growth gave the value for bacteriostatic action.

The dilutions were incubated for an additional 24 hours at 37° C. Subcultures were then made by transferring three loopfuls from cultures showing no growth to fresh broth. The resulting subcultures were incubated for 48 hours at 37° C. The highest dilution showing no growth was the end-point for bactericidal action.

Results obtained with the compound of Example 18 are given in Table I.

Table I

EFFECTIVE DILUTIONS OF METHOXY-BETA-ETHOXY METHYL-BIS(OCTYLBENZYLDIMETHYL AMMONIUM CHLORIDE)

| Organism | Dilution Values | |
|---|---|---|
| | Bacteriostatic | Bactericidal |
| S. aureus | 1: 512,000 | 1: 32,000 |
| S. pyogenes | 1:4,000,000 | 1:2,000,000 |
| S. fecalis | 1: 512,000 | 1: 64,000 |
| N. catarrhalis | 1:4,000,000 | 1: 512,000 |
| S. typhosa | 1: 256,000 | 1: 256,000 |
| P. aeruginosa | 1: 32,000 | 1: 16,000 |
| P. vulgaris | 1: 8,000 | 1: 8,000 |
| B. suis | 1: 512,000 | 1: 512,000 |
| C. welchii | 1: 128,000 | 1: 128,000 |

EXAMPLE 19

A mixture of 261 parts of heptylbenzyl chloride, 114 parts of bis(dimethylaminoethoxy)ethane, and 300 parts of toluene was heated under reflux for three hours. When the reaction mixture was cooled, a thick crystalline slurry resulted. This was treated with 250 parts of heptane and filtered. There was obtained on drying 330 parts of a colorless powder which corresponded to

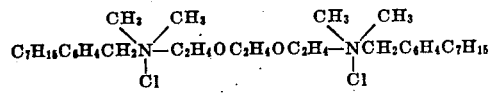

in a purity of 99%.

This product was found to have a phenol coefficient of 420 against *Salmonella typhosa* and of 665 against *Staphylococcus aureus*.

EXAMPLE 20

There were mixed 47.6 parts of an octylbenzyl chloride, 24.2 parts of (CH₃)₂NCH2OC2H4OC2H4OCH2N(CH₃)₂ and 80 parts of toluene, and this mixture was left standing for four days. Heptane was then added and the product appeared as a heavy oil in a lower layer, in which the heptane layer was separated. The product was treated several times with heptane and then stripped under low pressure at room temperature. A taffy-like product resulted, amounting to 57 parts. This product gave analyses which corresponded to

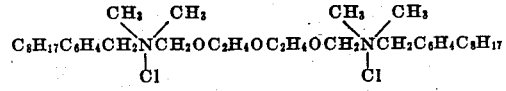

This product is most conveniently handled in a 50% aqueous solution. It has a phenol coefficient of 470 against *Salmonella typhosa* and of 710 against *Staphylococcus aureus*.

EXAMPLE 21

A mixture of 56 parts of (1-methylheptyl)benzyl bromide, 27.6 parts of (C2H5)₂NCH2OC2H4OC2H4OCH2N(C2H5)₂ and 100 parts of benzene was heated under reflux for two hours, cooled, and treated with heptane as in the previous example. A soft solid was obtained as a residue. This gave the correct nitrogen and bromine analyses for

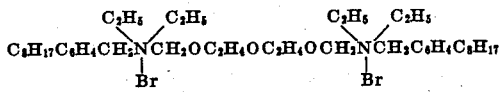

The compound is readily soluble in water and has a phenol coefficient of 500 against *Salmonella typhosa* and of 700 against *Staphylococcus aureus*.

EXAMPLE 22

A mixture of 49 parts of octylbenzyl chloride, 19.4 parts of bis(dimethylaminoethyl) formal, and 70 parts of toluene was heated at 90°–95° C. for three hours. To the hot solution 75 parts of heptane was added and when the mixture was cooled the product crystallized out. It was filtered off and was dried. The product was recrystallized from ethyl acetate and acetonitrile to yield 28.5 parts of pure quaternary ammonium salt,

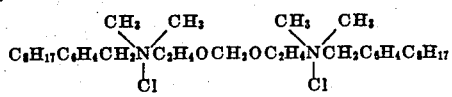

This compound was found to give a 30% solution which was stable and did not give any precipitate when stored at 0°–5° C. It was stable in alkaline solutions and was also stable when mixed with such alkaline products as sodium metasilicate, sodium tetrapyrophosphate, and sodium carbonate. It has a phenol coefficient of 1000 against *Salmonella typhosa* and of 1750 against *Staphylococcus aureus*.

The compound was evaluated by the dilution method described under Example 18. Results are presented in Table II.

Table II

EFFECTIVE DILUTIONS OF ETHOXYMETHOXYETHYL BIS(OCTYLBENZYLDIMETHYL AMMONIUM CHLORIDE)

| Organism | Dilution Values | |
|---|---|---|
| | Bacteriostatic | Bactericidal |
| S. aureus | 1:1,000,000 | 1: 128,000 |
| S. pyogenes | 1:4,000,000 | 1:1,000,000 |
| S. fecalis | 1: 512,000 | 1: 128,000 |
| N. catarrhalis | 1:1,000,000 | 1: 512,000 |
| S. typhosa | 1: 512,000 | 1: 512,000 |
| P. aeruginosa | 1: 128,000 | 1: 4,000 |
| P. vulgaris | 1: 32,000 | 1: 8,000 |
| B. suis | 1:1,000,000 | 1: 256,000 |
| C. welchii | 1: 64,000 | 1: 64,000 |

In the same way as shown just above there are reacted 52 parts of methyloctylbenzyl chloride and 19.5 parts of bis(dimethylaminoethyl) formal in 70 parts of toluene. The reaction product is worked up as above to give the compound

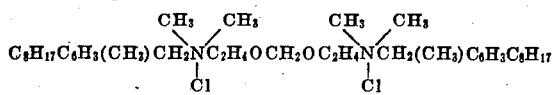

which has high solubility in water, stability to alkaline cleaners, and good bactericidal and fungicidal efficiency.

EXAMPLE 23

A mixture of 74 parts of methylnonylbenzyl chloride, 26.9 parts of bis(dimethylaminoethoxy)-methane, and 100 parts of toluene was heated under reflux for five hours. Heptane was added as in above examples and a solid product separated. This corresponded in composition to

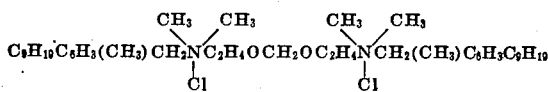

It has a phenol coefficient of 885 against *Salmonella typhosa* and of 1400 against *Staphylococcus aureus*.

EXAMPLE 24

A mixture of 51.4 parts of a nonylbenzyl chloride, 19.4 parts of bis(dimethylaminoethoxy) methane, and 70 parts of toluene was heated at 90°–100° C. for two hours. Upon addition of heptane the product was precipitated in crystalline form. The crystals were filtered off, washed with heptane, and dried. They gave the correct analyses for

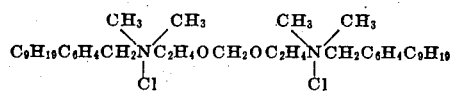

The yield of pure product was 67 parts. It was found extremely water-soluble and stable to alkaline media. It was also found to have a phenol coefficient of 685 against *Salmonella typhosa* and of 1200 against *Staphylococcus aureus*.

The evaluation by successive dilutions, as described above, yielded the data which are summarized in Table III.

Table III

EFFECTIVE DILUTIONS OF ETHOXYMETHOXYETHYL BIS (NONYLBENZYLDIMETHYL AMMONIUM CHLORIDE)

| Organism | Dilution Values | |
|---|---|---|
| | Bacteriostatic | Bactericidal |
| S. aureus | 1:1,000,000 | 1: 256,000 |
| S. pyogenes | 1:4,000,000 | 1:1,000,000 |
| S. fecalis | 1: 512,000 | 1: 16,000 |
| N. catarrhalis | 1:1,000,000 | 1: 128,000 |
| S. typhosa | 1: 512,000 | 1: 8,000 |
| P. aeruginosa | 1: 32,000 | 1: 1,000 |
| P. vulgaris | 1: 8,000 | 1: 1,000 |
| B. suis | 1: 512,000 | 1: 64,000 |
| C. welchii | 1: 64,000 | 1: 64,000 |

EXAMPLE 25

A mixture of 31.1 parts of bis(dimethylaminoethoxy) ethane, 77.4 parts of nonylbenzyl chloride, and 150 parts of toluene was heated at 80°–90° C. for five hours. At this time 75 parts of heptane was added and the mixture was cooled to 15° C. Crystals formed and were separated by filtration. They were dried to yield 97.5 parts of a light-colored powder, which by analysis was a quite pure bis-quaternary ammonium salt of the formula

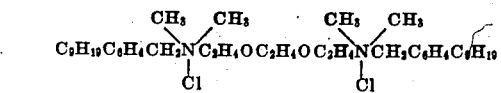

It was found extremely water-soluble and was stable to alkaline media. It gave a stable mixture with sodium metasilicate. It was found to have a phenol coefficient of 1250 against *Salmonella typhosa* and of 1000 against *Staphylococcus aureus*. Its 10-minute killing dilution *S. typhosa* was 1:1,000,000 and against *S. aureus* 1:700,000.

Its evaluation by the dilution method against various organisms is summarized in Table IV.

Table IV

EFFECTIVE DILUTIONS OF ETHOXYETHOXYETHYL-BIS (NONYLBENZYLDIMETHYL AMMONIUM CHLORIDE)

| Organism | Gram Type | Dilution Values | |
|---|---|---|---|
| | | Bacteriostatic | Bactericidal |
| S. aureus | + | 1:1,000,000 | 1:1,000,000 |
| S. pyogenes | + | 1:4,000,000 | 1:4,000,000 |
| S. fecalis | + | 1: 512,000 | 1: 4,000 |
| N. catarrhalis | − | 1:4,000,000 | 1:1,000,000 |
| S. Typhosa | − | 1: 256,000 | 1: 2,000 |
| P. aeruginosa | − | 1: 8,000 | 1: 1,000 |
| P. vulgaris | − | 1: 400 | 1: 1,000 |
| B. suis | − | 1: 512,000 | 1: 16,000 |
| C. welchii | − | 1: 512,000 | 1: 512,000 |

EXAMPLE 26

A mixture of 31.1 parts of bis(dimethylaminoethoxy) ethane, 77.4 parts of octylbenzyl chloride, and 150 parts of toluene was heated at 80°–90° C. for four and one-half hours. Crystals formed and heptane was added to the mixture which was cooled to room temperature. The crystals were filtered off and dried to yield 91 parts of a lightly tinted solid which corresponded in composition to

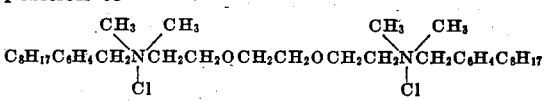

This compound gave a clear 40% aqueous solution which remained clear at 5° C. It was stable to alkaline cleaners. It was found to have a phenol coefficient of 885 against *Salmonella typhosa* and 925 against *Staphylococcus aureus*. Dilution data against various organisms are summarized in Table V.

Table V

EFFECTIVE DILUTIONS OF ETHOXYETHOXYETHYL-BIS (OCTYLBENZYLDIMETHYL AMMONIUM CHLORIDE)

| Organism | Dilution Values | |
|---|---|---|
| | Bacteriostatic | Bactericidal |
| S. aureus | 1:1,000,000 | 1:1,000,000 |
| S. pyogenes | 1:4,000,000 | 1:2,000,000 |
| S. fecalis | 1:1,000,000 | 1: 8,000 |
| N. catarrhalis | 1:2,000,000 | 1: 128,000 |
| S. typhosa | 1: 512,000 | 1: 512,000 |
| P. aeruginosa | 1: 64,000 | 1: 2,000 |
| P. vulgaris | 1: 16,000 | 1: 2,000 |
| B. suis | 1:1,000,000 | 1: 32,000 |
| C. welchii | 1: 256,000 | 1: 256,000 |

EXAMPLE 27

A mixture of 46.2 parts of decylbenzyl chloride, 17.9 parts of bis(dimethylaminoethoxy) ethane, and 100 parts of benzene was heated for two hours under reflux. Heptane was added and the mixture cooled. The product appeared as crystals, which were filtered off and dried. The yield was 52.5 parts of lightly colored solid which was 95% pure bis-quaternary ammonium chloride by chloride titration. The product had the composition

C10H21C6H4CH2NC2H4OC2H4
 OC2H4NCH2C6H4C10H21

It had a phenol coefficient of 352 against *Salmonella typhosa* and of 140 against *Staphylococcus aureus*.

All of the compounds of this invention exhibit considerable capacity for destroying fungi or inhibiting their growth. In general, dilutions of the order of 0.001% are effective in inhibiting in standard agar plate tests the growth of spores of such fungi as *Sclerotinia fructicola* or *Macrosporium sarcinaeforme* and also preventing growth of such fungi as *Aspergillus niger*, *Chaetomium globosum*, Metarrhizium sp., etc.

The compounds in which there are eight or nine carbon atoms present in the alkyl group of the N-benzyl substituents are particularly effective and are economically prepared from readily available starting materials. Another preference is for compounds having two to three ether groups, although the compounds with a single ether group or with more than three are also effective compounds. While chloride and bromine are the common anions in the quaternary salts as synthesized, the anions are not confined to these two. The chlorides or bromides may be converted to other salts through the well-known expedient of metathesis. In many cases a sodium salt having the desired anion, such as acetate, sulfate, silicofluoride, etc., can be reacted in solution with a chloride or bromide and sodium chloride or bromide precipitated. Metathesis with silver salts may likewise be practiced, particularly when the desired anion is the hydroxyl group.

The quaternary ammonium compounds of this invention are characterized chemically by the presence of N-alkylbenzyl substituents, in which the alkyl group contains seven to ten carbon atoms, and of an ether-containing group joining two quaternary nitrogen atoms. These compounds have excellent solubility. They are effective bactericidal agents as shown by their high phenol coefficients and are also fungicidally active. They are effective at considerable dilutions against a great variety of organisms, both Gram-positive and Gram-negative. They are stable in the presence of the usual alkaline agents used as cleaners and can be used in conjunction with non-ionic detergents, such as octylphenoxy-polyethoxyethanol.

I claim:
1. As new chemical substances, compounds of the formula

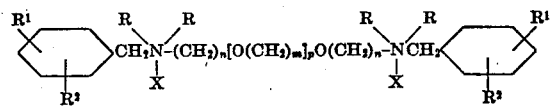

wherein R is an alkyl group of not over two carbon atoms, $R^1$ is an alkyl group of seven to ten carbon atoms, $R^2$ is a member of the class consisting of hydrogen and the methyl group, $m$ is an integer from one to two, $n$ is an integer from one to two, $p$ is a number from zero to three, and X is an anion.

2. As new chemical substances, compounds of the formula

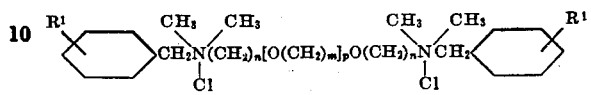

wherein $R^1$ is an alkyl group of seven to ten carbon atoms, $m$ is an integer from one to two, $n$ is an integer from one to two, and $p$ is a number from zero to three.

3. As new chemical substances, compounds of the formula

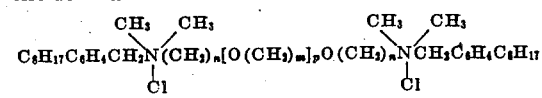

wherein $m$ is an integer from one to two, $n$ is an integer from one to two, and $p$ is a number from zero to three.

4. As a new chemical substance, a compound of the formula

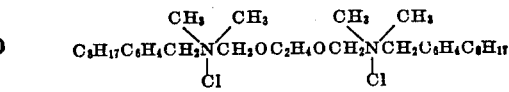

5. As a new chemical substance, a compound of the formula

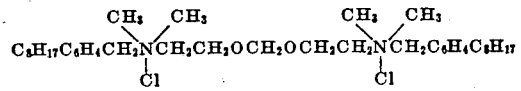

6. As a new chemical substance, a compound of the formula

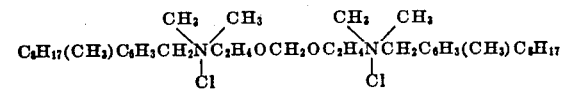

7. As new chemical substances, compounds of the formula

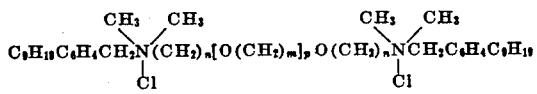

wherein $m$ is an integer from one to two, $n$ is an integer from one to two, and $p$ is a number from zero to three.

8. As a new chemical substance, a compound of the formula

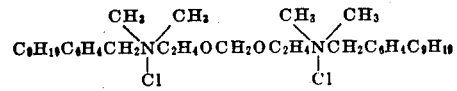

9. As a new chemical substance, a compound of the formula

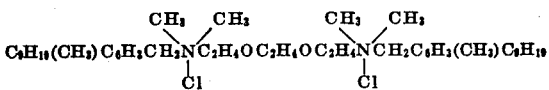

PETER L. DE BENNEVILLE.

No references cited.